(12) United States Patent
Fünfschilling et al.

(10) Patent No.: US 6,606,134 B1
(45) Date of Patent: Aug. 12, 2003

(54) REFLECTIVE FERROELECTRIC LIQUID CRYSTAL DISPLAY AND PROJECTION SYSTEM

(75) Inventors: Jürg Fünfschilling, Basel (CH); Martin Schadt, Seltisberg (CH)

(73) Assignee: Rolic AG, Zug (CH)

( * ) Notice: Subject to any disclaimer, the term of this patent is extended or adjusted under 35 U.S.C. 154(b) by 0 days.

(21) Appl. No.: 09/036,214

(22) Filed: Mar. 6, 1998

(30) Foreign Application Priority Data

Mar. 11, 1997 (CH) ............................................. 582/97

(51) Int. Cl.$^7$ ............................................. G02F 1/133
(52) U.S. Cl. ......................................... 349/74; 379/173
(58) Field of Search ................................ 349/117, 171, 349/172, 173, 174, 37, 74

(56) References Cited

U.S. PATENT DOCUMENTS

| | | | | |
|---|---|---|---|---|
| 3,960,438 A | * | 6/1976 | Bonne | 349/96 |
| 4,838,663 A | * | 6/1989 | Lagerwall et al. | 349/117 |
| 5,132,826 A | * | 7/1992 | Johnson et al. | 349/18 |
| 5,168,381 A | * | 12/1992 | Walba et al. | 349/77 |
| 5,552,911 A | * | 9/1996 | Okada et al. | 349/106 |
| 5,818,548 A | | 10/1998 | Funfschilling et al. | 349/33 |
| 5,847,790 A | * | 12/1998 | Andersson et al. | 349/100 |

FOREIGN PATENT DOCUMENTS

| EP | 0 309 774 | 4/1989 |
|---|---|---|
| GB | 2263982 | 8/1993 |

OTHER PUBLICATIONS

Schadt et al., "Surface–Induced Parallel Alignment of Liquid Crystals by Linearly Polymerized Photopolymers," Jpn. J. Appl. Phys., vol. 31 (1992), pp. 2155–2164.

Schadt et al., "Photo–Generation of Linearly Polymerized Liquid Crystal Aligning Layers Comprising Novel, Integrated Optically Patterned Retarders and Color Filters," Jpn. J. Appl. Phys., vol. 34, (1995), pp. 3240–3249.

S. Pancharatnam, "Achromatic Combinations of Birefringent Plates," Proc. Indian Acad. Sci., A41 (1995), pp. 137–144.

Schadt et al., "Photo–Induced Alignment and Patterning of Hybrid Liquid Crystalline Polymer Films on Single Substrates," Jpn. J. Appl. Phys., vol. 34 (1995) pp. L764–L767.

Fünfschilling, J.; Schadt, M.; Performance of Conventional and Novel Deformed Helix Ferroelectric Liquid Crystal Display Operating Modes, Japanese Journal of Applied Physics, 35, part 1 No. 1, 5765–5774 (1996).

* cited by examiner

*Primary Examiner*—Kenneth Parker
(74) *Attorney, Agent, or Firm*—Finnegan, Henderson, Farabow, Garrett & Dunner, LLP

(57) ABSTRACT

A major disadvantage of known reflective displays consists in the fact that they ideally have a switching angle of ±45° in the so-called symmetric mode. With the liquid crystal mixtures known to date, this is not possible without hysteresis effects occurring even at small switching angles and resulting in the switching time being increased to an impermissible extent. The invention relates to a novel reflective, ferroelectric display which can be actuated without DC voltage and has a maximum switching angle α which is ±22.5°. The liquid crystal display according to the invention is distinguished in particular by the fact that a further birefringent element is arranged between the two plates bounding the birefringent liquid crystal layer. In a first category of liquid crystal displays according to the invention, this additional birefringent element is a transparent plate having an optical path difference $\Delta n \cdot d \approx \lambda/4$, which is arranged after the liquid crystal layer in the direction of the light incidence, in particular between said layer and the mirror.

9 Claims, 4 Drawing Sheets

| I TENSION METER | II POINT 7 | III LIQUID CRYSTAL | IV POINT 8 | V HALF WAVE PLATE | VI POINT 9 | VII LIQUID CRYSTAL | VIII POINT 10 | IX BEAM |
|---|---|---|---|---|---|---|---|---|
| 0 | ↕ 0° | ⬭ 90° | ↕ 0° | ⬭ 0° | ↕ 0° | ⬭ 90° | ↕ 0° | 1 |
| U<sub>MAX</sub> | ↕ 0° | ⬭ 112.5° | ⤢ 225°=45° | ⬭ 0° | ⤡ 135° | ⬭ 112.5° | ↔ 90° | 0 |
| -U<sub>MAX</sub> | ↕ 0° | ⬭ 67.5° | ⤡ 135° | ⬭ 0° | ⤢ 225°=45° | ⬭ 67.5° | ↔ 90° | 0 |

FIG. 10

| Ia TENSION COMPENSATOR | I TENSION METER | II POINT 7 | III LIQUID CRYSTAL | IV POINT 8 | V HALF WAVE PLATE | VI POINT 9 | VII LIQUID CRYSTAL | VIII POINT 10 | IX BEAM |
|---|---|---|---|---|---|---|---|---|---|
| $-U_2$ | $-U_{MAX}$ | ↕ 0° | ⬭ 90° | ↕ 0° | ⬭ 0° | ↕ 0° | ⬭ 90° | ↕ 0° | 1 |
| $U_2$ | $U_{MAX}$ | ↕ 0° | ⬭ 112.5° | ⤢ 225°=45° | ⬭ 45° | ⤢ 225°=45° | ⬭ 112.5° | ↕ 0° | 0 |
| $-U_2$ | $U_{MAX}$ | ↕ 0° | ⬭ 90° | ↕ 0° | ⬭ 45° | ↔ 45° | ⬭ 90° | ↔ 90° | 0 |
| $U_2$ | $-U_{MAX}$ | ↕ 0° | ⬭ 112.5° | ⤢ 225°=45° | ⬭ 0° | ⤡ 135° | ⬭ 112.5° | ↔ 90° | 0 |

FIG. 11

REFLECTIVE FERROELECTRIC LIQUID CRYSTAL DISPLAY AND PROJECTION SYSTEM

BACKGROUND OF THE INVENTION

1. Field of the Invention

The invention relates to a reflective liquid crystal display having a ferroelectric, chiral smectic liquid crystal layer.

The invention also relates to a projection system and a direct view display which has a liquid crystal display of the above-mentioned type.

The display according to the invention has, for example, a birefringent liquid crystal layer which is also referred to below as a $S_c^*$ layer and whose helical configuration is deformable by the action of an electric field.

2. Description of the Prior Art

A known liquid crystal display based on the deformation of a helical liquid crystal configuration is disclosed in EP-B-0 309 774. For example, the display disclosed in this prior publication and also referred to as a DHF cell (DHF represents Deformed Helix Ferroelectric) has a pair of transparent plates which together enclose the $S_c^*$ layer and which are each provided with a surface structure orienting a molecule of the $S_c^*$ layer, with electrodes for generating an electric field in the liquid crystal and with a polarizer.

The liquid crystals which can be used for DHF cells are distinguished by the fact that the molecules which belong to a smectic layer and are arranged essentially parallel to one another are arranged not perpendicular to the smectic plane but at a smectic tilt angle θ to the normal of the plane. The chirality of the $S_c^*$ layer additionally results in the axes of the liquid crystal molecules being rotated relative to one another from layer to layer, so that consequently a screw-like helix having a pitch p forms.

In the rest state, i.e. without an applied electric field, the DHF cell exhibits a specific light transmittance. If a voltage is applied to the electrodes, an electric field is generated in the $S_c^*$ layer and reorients the molecules and thus causes a reorientation of the individual smectic layers. Application of the voltage thus deforms the helix of the $S_c^*$ layer, resulting in a change in the light transmittance.

A DHF display is based on a liquid crystal configuration which has a short pitch p. The pitch p is chosen so that the light is averaged over the coils of the helix, i.e. experiences only an average refractive index. For an undistorted helix, a birefringent layer having an optical axis parallel to the helix axis is thus obtained. If a voltage is applied between the electrodes of the two plates, in particular torques act on the individual smectic layers. These torques produce the stated deformation of the helix and consequently also a rotation of the optical axis in a plane parallel to the plates bounding the liquid crystal layer. The rotation of the optical axis as a function of the applied voltage can be determined in practice by means of the switching angle α(U). The maximum switching angle a ($U \geq U_s$) is a characteristic feature of the DHF cell and corresponds to the angle of rotation of the optical axis between the saturation voltage $U=|U_s|$ and $U=0$.

Reflective liquid crystal displays of the DHF type can be produced essentially by two different methods.

The first simpler method of production consists in mounting an optical mirror or a diffuse reflector on one side of a transmitting display cell known per se and consisting of a pair of transparent plates which together enclose a liquid crystal layer and are each provided with a surface structure and a polarizer. During operation of this first embodiment of reflective cells, the light then passes twice through the transmitting display cell. Most liquid crystal displays in clocks and watches, pocket calculators, etc. are based on this principle. Because the light passes a total of four times through a polarizer, large light losses occur in these displays. Reflective displays of this type additionally exhibit troublesome parallax effects at high resolution.

A second embodiment of reflective liquid crystal displays is shown in FIG. 1. In this display, the incident light 1 is linearly polarized by a polarizer 2, passes through the liquid crystal layer 3, is then reflected by a mirror 4 and passes once again through the liquid crystal layer 3 and the preceding polarizer 2. In this case, electrode and actuating means which can modify the birefringence properties of the liquid crystal according to the desired image information are additionally provided between the liquid crystal layer 3 and the mirror 4.

A major disadvantage of the display shown in FIG. 1 consists in the fact that it should ideally have a switching angle of ±45° in the so-called symmetric mode. This is not possible with the liquid crystal mixtures known to date without resulting, even at small switching angles, in hysteresis effects which increase the switching time to an impermissible extent. Furthermore, the required voltage is greater for large switching angles than for small ones, which is another disadvantage of this type of display.

If, on the other hand, reflective DHF cells of the above-mentioned type are operated in the so-called asymmetric mode, the above-mentioned disadvantage can be at least partially eliminated with the asymmetric actuation. In this case, however, the electrical actuation cannot be effected by periodic pole reversal. This method of operation thus has a DC voltage component, which results in disadvantageous formation of space charges in the liquid crystal and at the interfaces. In fact, these space charges change the electrooptical characteristics, with the result that serious image defects and ghost images may form.

SUMMARY OF THE INVENTION

It is the object of the invention to provide a reflective DHF display which can be actuated without DC voltage and has a maximum switching angle a which is smaller than ±45°.

This object is achieved, according to the invention, by a liquid crystal display having
- a chiral smectic, birefringent liquid crystal layer, whose optical axis can be electrooptically rotated in the plane of the display,
- a polarizer and
- a pair of parallel plates which enclose the liquid crystal layer and each of which is provided with a surface structure orienting the molecules of the liquid crystal layer and at least one electrode for generating an electric field, wherein
  - a light-reflecting mirror or a diffuse reflector being coordinated with one of the two plates,
  - a further birefringent layer or a further birefringent plate or film is arranged between the two plates,
  - the rotation of the optical axis of the liquid crystal layer is not more than ±22.5° and
  - the display is formed in such a way that it can represent all gray values without DC voltage.

The use of the present invention is not restricted only to DHF cells but relates to all liquid crystal displays in which the electrooptical effect causes a rotation of the optical axis. It is particularly advantageous when the rotation of the optical axis during operation of the display shown in FIG. 1 is too small. Another class of liquid crystal cells which—like the DHF cell—can be used for providing reflective displays of the type according to the invention is described in Swiss Patent Application No. 3073/96. Such cells are referred to below as APD (APD represents Alternating Polarization Domain) cells. Their advantages are low operating voltages and low currents. Like DHF cells, the APD cells too, in the embodiment according to the invention, have a maximum switching angle α which is smaller than ±45°.

The liquid crystal display according to the invention is distinguished in particular by the fact that the components of the reflective display described above with reference to FIG. 1 are also provided with a further birefringent element, in the form of an additional birefringent layer (or plate) or in the form of a second, switchable liquid crystal layer.

In a first category of liquid crystal displays according to the invention, this additional birefringent element is a solid, i.e. non-switchable plate 5 having an optical path difference $\Delta n \cdot d \approx \lambda/4$ (where An denotes the birefringence and d the wall thickness of the plate 5 ), i.e. a quarter-wave plate which—as shown in FIG. 2—is arranged after the liquid crystal layer 3 in the direction of incidence of the light, and in particular between said layer and the mirror 4. Since the light passes twice through the plate 5 during operation of the display, the optical path differences of said plate sum to $\lambda/2$, for which reason the plate 5 can also be designated, in terms of a model, as a half-wave plate or half-wave layer.

In a second category of liquid crystal displays according to the invention, the additional birefringent component is a second switchable liquid crystal layer which is arranged in the form of a compensator 105, described in more detail below, between the polarizer 102 and the specified liquid crystal layer 103. FIG. 3 shows a corresponding configuration, from which it is evident that in this case the incident light 101 is first linearly polarized by the polarizer 102 then passes through the upcircuit compensator 105 and the liquid crystal layer 103, is reflected by the mirror 104 and then passes once again through the liquid crystal layer 103, the cell 105 and the preceding polarizer 102.

BRIEF DESCRIPTION OF THE DRAWINGS

Preferred embodiments of the invention are described in more detail below with reference to the attached drawings.

FIG. 10 shows the orientation and birefringence properties of the cell arrangement shown in FIG. 5, and FIG. 11 shows the orientation and birefringence properties of the cell arrangement shown in FIG. 8.

DETAILED DESCRIPTION OF THE PREFERRED EMBODIMENTS

Figure 4:
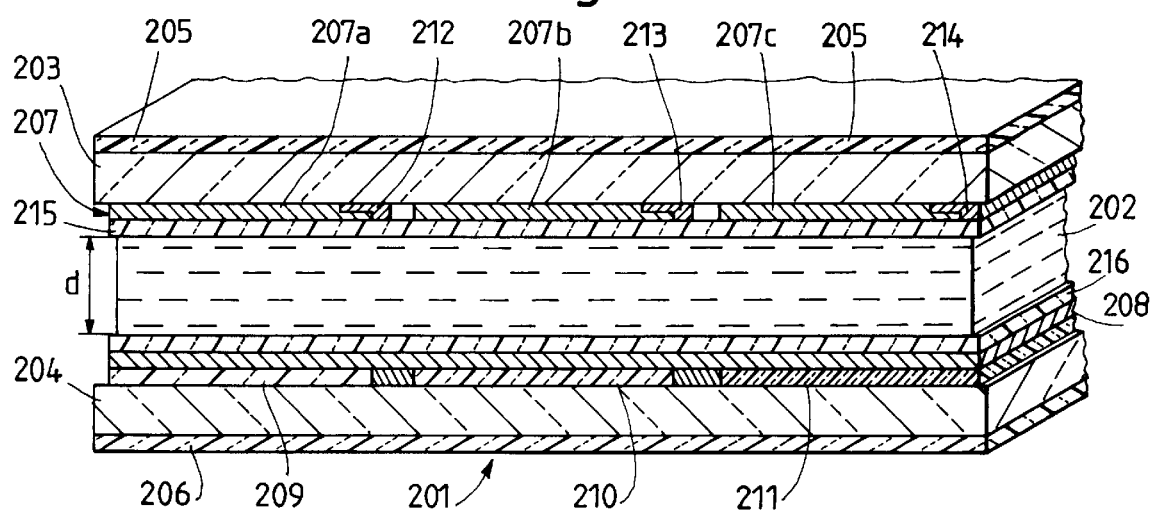
FIG. 4 shows a schematic representation of a conventional DHF cell.

As shown in FIG. 4, a conventional, transmitting DHF cell 201 has a $S_c*$ layer 202 with a layer thickness d, which is arranged between two plates 203 and 204 of transparent material which are parallel to one another. Suitable transparent materials for the parallel plates 203 and 204 are, for example, glass, acrylic glass or plastics films.

A polarizer 205 is present on the outside of the upper plate 203 and is preferably connected to the plate 203, for example adhesively bonded to said plate. Accordingly, a polarizer 206 is assigned to the lower plate 204 in an analogous manner, said polarizer serving as an analyzer when, in the embodiment shown, the light is incident from above and passes once through the cell. In a reflective cell configuration, this second polarizer 206 is dispensed with. If the light is incident from below, the first polarizer 205 is then dispensed with. In place of the omitted polarizer, the cell then has a light-reflecting mirror or a diffuse reflector.

The liquid crystal layer 202 is furthermore bounded by two transparent electrodes 207 and 208 which form the usual electrode segments intended for displaying characters or image dots, the section illustrated here showing only the elements of an individual electrode segment which is divided into the three color pixels for the colors red, green and blue for displaying an image dot. Thus, the upper section of the electrode 207 is divided into three subelectrodes 207a, 207b and 207c and the opposite section of the electrode 208, which may optionally also be segmented, is provided with color filters 209, 210 and 211 coordinated with the individual subelectrodes 207a, 207b and 207c. Each subelectrode 207a, 207b and 207c—also referred to as a pixel electrode—also has electronic components 212, 213 and 214, such as, for example, thin-film transistors and the like. The latter together with driver electronics which are not shown and by means of which the subelectrodes 207a, 207b and 207c can be actuated independently of one another form an active matrix.

Those surfaces of the glass plates 203 and 204 which face the $S_c*$ layer are furthermore treated in such a way that they have an orienting effect on the adjacent liquid crystal molecules and thus also on the entire liquid crystal layer and thus determine the direction of the director. This treatment consists, for example, in coating with a polymer layer and in rubbing the surfaces in one direction. Other possibilities are photo-oriented orientation layers or the application of orienting layers by an oblique incidence vacuum deposition method. Such layers are shown in FIG. 4 and denoted by 215 and 216.

In the first category of displays according to the invention, the additional birefringent element is—as already mentioned—formed by a solid, i.e. non-switchable, quarter-wave plate which is arranged between the liquid crystal and the light-reflecting mirror or the diffuse reflector.

Figure 1:
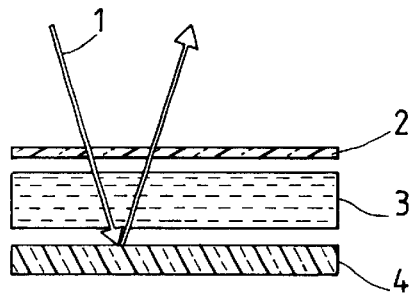
FIG. 1 shows an embodiment of a reflective liquid crystal display.
Figure 2:
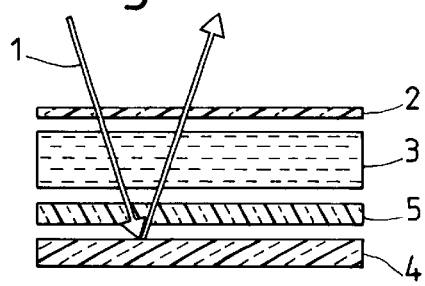
FIG. 2 shows an embodiment of a reflective liquid crystal display as in FIG. 1 with an additional birefringent layer.

According to the invention, a liquid crystal layer 3 having an optical path difference $\Delta n \cdot d \approx \lambda/2$ is chosen for this liquid crystal display shown only schematically in FIG. 2—but formed essentially according to the above embodiment for FIG. 4 as a DHF cell and intended, for example, for installation in a direct view display, $\lambda$ being an average ideal wavelength and being, for example, about 500 nm. This liquid crystal layer is therefore also referred to below as a half-wave layer. As already mentioned at the outset, $\Delta n \cdot d \approx \lambda/4$ is chosen for the non-switchable, birefringent plate 5.

Figure 5:
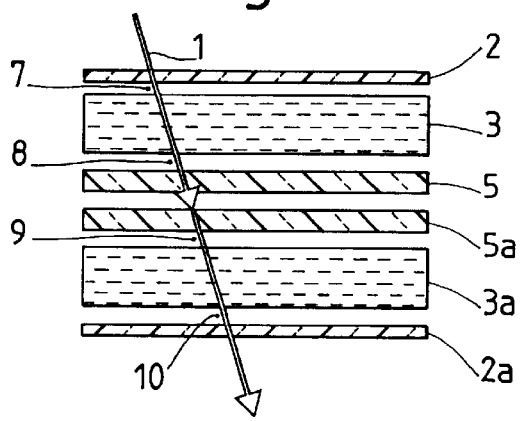
FIG. 5 shows an optical model (equivalent circuit diagram) for describing the first category of displays according to the invention.

The mode of action of the combination of a reflective liquid crystal cell known per se with an additional birefringent plate can be explained for the first category of displays according to the invention with reference to FIGS. 5 and 10.

Here, it is assumed that the mirror is ideal, which means that it can then be replaced in terms of a model by two birefringent layers 3a and 5a corresponding to the liquid crystal layer 3 and the quarter-wave plate 5, respectively, and by a polarizer 2a. In this model, the light 1 thus passes through the four birefringent layers or plates 3, 5, 5a and 3a without reflection.

Since the birefringent plates 5 and 5a are in series, their optical path differences $\Delta n \cdot d$ sum to $\approx \lambda/2$. In terms of a model, the reflective display of FIG. 5 is thus described by three half-wave plates or half-wave layers (3; 5/5a; 3a) between two parallel polarizers, the first and last plate 3 and 3a, respectively, being identical, having parallel optical axes and being capable of electrooptical rotation.

The effect of a half-wave plate on linearly polarized light can be very simply described. The linear polarization direction is reflected at the optical axis. It is thus easy to follow the development of polarization on passing through the three half-wave plates. This is shown in FIG. 10. The display (columns III and VII) is oriented in such a way that its optical axis is oriented parallel to the polarizer 2 for the voltage zero (first row). The optical axis of the birefringent plate 5 (column V) is perpendicular to this. Since the polarization is always parallel or perpendicular to the optical axes, it does not change and the light can pass unattenuated through the polarizer 2a. If a voltage is applied to the display, the optical axis rotates. If the rotation is 22.5° (row 2), the axis in columns III and VII rotates from 90° to 112.5°. At point 7 in FIG. 5, the polarization is determined by the polarizer 2 (=0°). After passing through the layer 3, it is rotated by $2 \cdot 112.5° = 225°$ (column IV, point 8), which is equivalent to a rotation of 45°, since the display is insensitive to a rotation through 180°. The polarization is rotated to 135° (point 9, column VI) on passing through the half-wave plate 5/5a (column V), and back to 90° (point 10, column VIII) on passing the second time through the layer 3a (column VII). This polarization is finally blocked by polarizer 2a, i.e. a voltage which rotates the optical axis by 22.5° switches from light to dark. It is possible to ascertain from row 3 in FIG. 10 that the same is also true for rotation of −22.5°. The necessary, maximum switching angle for switching from light to dark is thus only ±22.5°.

The object set at the outset with regard to a maximum switching angle $\alpha < \pm 45°$ is thus achieved.

The first category of displays according to the invention has a further advantage. In the present case, the switching liquid crystal cell is a $\lambda/2$ layer. Other reflective displays use switching $\lambda/4$ layers, i.e. liquid crystal layers having a cell spacing which is half that in the present case. The small electrode spacings therefore make production of ferroelectric displays very difficult, in particular in terms of the danger of short-circuits and the necessity of maintaining extreme clean-room conditions and narrow tolerances for the layer thickness d in the production of the corresponding cells. The possibility of producing reflective displays with twice the cell spacing d is thus a very important step towards the commercialization of ferroelectric displays.

Further detailed information on the formation of a display of the first category described above is given below with reference to FIGS. 6 and 7.

Figure 6:
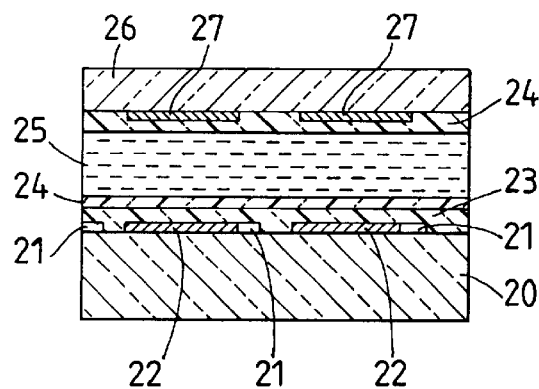
FIG. 6 shows a schematic representation of a first embodiment of a display according to the invention.

Thus, FIG. 6 shows a first possible embodiment of such a display. The active matrix components 21 with all necessary supply lines and reflective electrodes 22 isolated pixel by pixel are present on the substrate 20. According to the embodiment for FIG. 4, the substrate may be a glass plate or a plastics film. Alternatively, the substrate may also be a silicon crystal on which the active matrix components 21 (such as, for example, transistors and the like) are applied epitaxially together with the corresponding actuation electronics (known by the term "silicon backplane"). The reflective electrodes 22 optionally provided from aluminum applied by vapor deposition are covered with a birefringent quarter-wave layer 23. This may be formed from an oriented plastics film or a glass-like liquid crystal layer or from liquid crystal molecules crosslinked with one another.

To produce a crosslinked liquid crystal layer, an orientation layer, which is not shown, can be applied to the substrate 20 by spin-coating and a preferred direction of the liquid crystal molecules to be crosslinked with one another can thus be defined. To avoid endangering the highly sensitive active matrix components here, it is advisable to orient the liquid crystal layer using the so-called LPP method [described in M. Schadt, K. Schmitt, V. Kozinkov and V. Chigrinov, Jpn. J. Appl. Phys., Vol. 31, 2155, 1992], which manages without the risky rubbing. The crosslinkable liquid crystal mixture is then applied to this orientation layer by spin-coating and is crosslinked (e.g. photocrosslinked) [described in M. Schadt, H. Seiberle, A. Schuster and S. M. Kelly, Jpn. J. Appl. Phys., Vol. 34, 3240–3249, 1995]. By the correct choice of thickness of this layer, the desired optical pitch difference of the quarter-wave layer 23 thus produced can be established.

The quarter-wave layer 23 is followed by a first orientation layer 24 with an associated ferroelectric liquid crystal layer 25. Finally—according to the embodiment for FIG. 4—a second orientation layer 24 and transparent electrodes 27 are coordinated with a cover plate 26 facing the incident light. For the orientation layers 24, too, an LPP layer is preferable here to a rubbed layer. The exact thickness of the liquid crystal layer 25 is ensured by spacers which are not shown.

In the embodiment in FIG. 6, the liquid crystal layer 25 is electrically in series with the capacitance of the quarter-wave layer 23. Particularly in the case of ferroelectric mixtures with large spontaneous polarization, this results in a great reduction in the voltage over the liquid crystal. It is for this reason that the APD display cell with its small spontaneous polarization is particularly suitable for this application.

Figure 7:
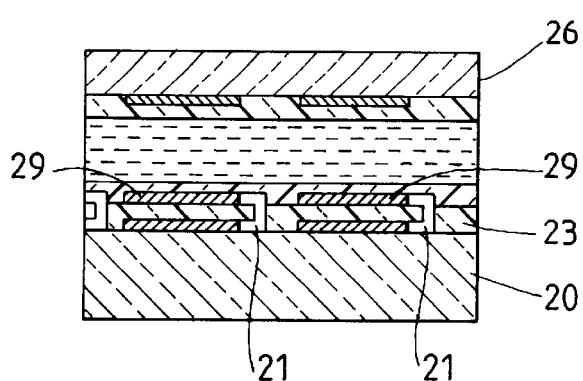
FIG. 7 shows a schematic representation of a second embodiment of a display according to the invention.

The disadvantage of the voltage reduction over the liquid crystal is eliminated by the embodiment in FIG. 7. In this second embodiment, the plates 20 and 26 and the active matrix components 21 are formed in the same way as in the example shown in FIG. 6. The light-reflecting layer need not now be formed by the reflective electrodes, as described above. It may also be realized by a dielectric mirror. In this case, the corresponding electrodes are then applied as transparent electrodes 29 to the quarter-wave layer 23 formed, for example, from crosslinked liquid crystal molecules and are connected to the active matrix components via appropriate holes. These holes may be produced, for example, photolithographically, an appropriately perforated mask being used for this purpose during the crosslinking of the quarter-wave layer 23. In the embodiment in FIG. 7, the full voltage of the driver electronics is present over the liquid crystal.

If a conducting (e.g. metallic) mirror is used, it can be electrically connected to a defined potential with respect to the counter electrode (i.e. the electrode not contacted by the active matrix elements), thereby forming a capacitor together with the active-matrix-driven electrode. Such a storage capacitor allows to use lower voltages and renders the display less sensitive to ionic impurities.

Figure 7A:
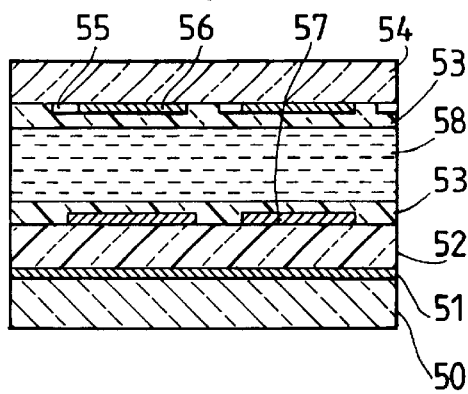
FIG. 7a shows a schematic representation of a third embodiment of a display according to the invention.

A third embodiment of the first category of the invention is depicted in FIG. 7a. The role of active matrix driven electrode and counter electrode are exchanged in this embodiment. The active matrix 55 is positioned on the transparent substrate 54 and drives the transparent electrodes 56. The counter electrodes 57 are also transparent. Thus the full voltage is applied to the liquid crystal layer 58 (neglecting the voltage drop over the orientation layer 53). The counter electrodes 57 to the active matrix driven electrodes 56 are positioned on the birefringent plate 52, which in turn is mounted onto the mirror 51 and the substrate 50. This third embodiment avoids the voltage drop over the birefringent plate of the first embodiment as well as the additional complication of the contacting the electrodes through the birefringent plate of the second embodiment.

In the second category of displays according to the invention (FIG. 3), the additional birefringent element is a second switchable liquid crystal layer which is arranged in the form of a compensator 105 between the polarizer 102 and the specified liquid crystal 103.

The compensator 105 applied to the light incidence side of the liquid crystal display is formed, for example, as a DHF cell. In this case, it has no additional polarizers, in contrast to the DHF cell shown in FIG. 4. The compensator 105 can of course also be formed by another type of liquid crystal cell. However, this must then have the physical properties preferred for the purpose according to the invention, for example a short switching time.

In addition, the compensator 105 formed essentially as a separate liquid crystal cell may have only a single, unstructured electrode pair, i.e. this cell switches simultaneously for all pixels (or a subset of pixels such as a row). This means that the compensator 105 switches only between two states, i.e. between two orientations of the optical axis. During operation, an image with one orientation is thus alternated with the next image with the other orientation in a synchronized manner. This switching process can always be achieved by means of a square-wave voltage without a DC voltage component, a precondition for virtually all liquid crystal displays. To enable the image-producing liquid crystal layer 103 in FIG. 3 also to be actuated without DC voltage, the reflection must not change on simultaneous pole reversal of compensator 105 and liquid crystal layer 103 but must be capable of being varied from 0 to 1 over the individual pixels of the cell 103 by the choice of the voltage. That this is possible is shown schematically for the light and the dark state in FIG. 11 described below.

In this case, the compensator 165 is a half-wave plate. Relative to this, the liquid crystal layer 103 has an optical path difference of $\Delta n \cdot d \approx \lambda/4$. Because of the mirror or diffuse reflector, the liquid crystal layer 103 may be regarded in terms of a model as a half-wave plate, cf. FIG. 8.

The display is light when the liquid crystal layer 103 switches with maximum voltage and the same sign as the compensator voltage (rows 1 and 2 in FIG. 11) and dark when it switches with maximum voltage but opposite sign (rows 3 and 4 in FIG. 11). Gray values are generated for switching voltages less than $U_{max}$. As can be seen from FIG. 11, the switching angle of the liquid crystal layer 103 varies from 0°–45° or between ±22.5°, i.e. the initial object of reducing the switching angle is also achieved by this embodiment of the invention.

Figure 3:
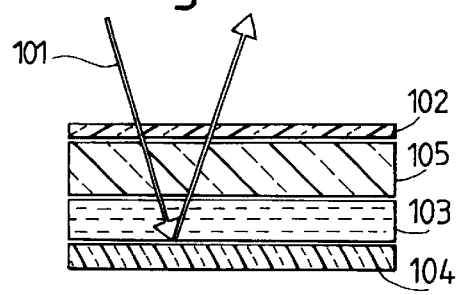
FIG. 3 shows another liquid crystal display with an additional birefringent component.
Figure 8:
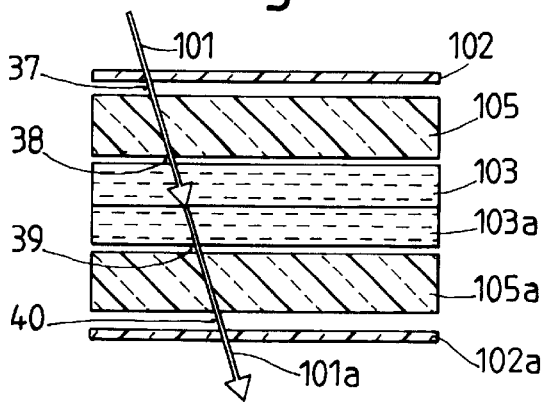
FIG. 8 shows an optical model for describing the second category of displays according to the invention.

For this two-cell display in FIGS. 3, 8 and 11, the image information must not be applied row by row to the liquid crystal 103, since otherwise part of the image would see the incorrect compensator position; instead, said information must be applied once and synchronously for pole reversal of the compensator 105. This actuation is readily possible with the above-mentioned "silicon backplanes". By means of these highly integrated circuits, the image information is temporarily stored on the chip and then applied parallel or simultaneously to all pixels. Since large silicon chips are very expensive, this embodiment is suitable in particular for projection displays with large magnification.

For displays having a large area, the compensator 105 may also be structured row by row and actuated synchronously with the row-by-row writing of the image information, similarly to the transmitting two-layer DHF display disclosed in Swiss Patent Application No. 3143/95. This dispenses with the necessity of a "silicon backplane" for this embodiment.

Figure 9:
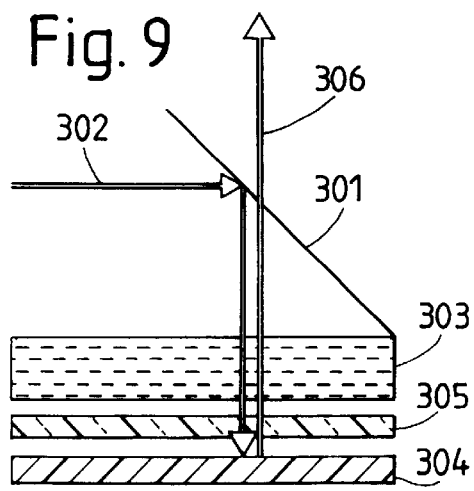
FIG. 9 shows an alternative embodiment of the polarizer shown in FIGS. 2 and 3.

Finally, FIG. 9 shows an alternative design of the polarizer 2 or 202, which is suitable in particular for reflecting projection systems or projection apparatuses. In FIG. 9, it is combined with the display shown in FIG. 2 but it may also be adapted to the display in FIG. 3. In this case, the polarizer is a polarizing beam divider 301. Here, a linearly polarized component of the incident light 302 is deflected by the beam divider 301 onto the display. After reflection by the mirror 304, the light passes a second time through the half-wave plate 305 and the liquid crystal layer 303 above said plate. The polarization state of the light is then analyzed on further passage through the beam divider 301. Once again, only a linear polarization, in this case the light beam 306, is transmitted. This can then be projected onto a screen by means of an optical projection system. The component transmitted in this manner is polarized oppositely to the beam first reflected by the beam divider 301, i.e. the polarizing beam divider 301 has the same effect as two cross polarizers. Accordingly, "0" and "1", i.e. light and dark, must therefore be interchanged in column IX in FIGS. 10 and 11. FIG. 9 thus describes a projection system which is dark in the voltage-free state and becomes increasingly light with positive or negative voltage until the angle of rotation of the optical axis is ±22.5°. If the degree of polarization of the beam divider 301 is insufficient, the contrast can be improved by the use of additional polarizer films.

A comparison of the light transmittance of a display according to the invention with a simple transmitting cell is shown in the following graph. The latter shows a calculated transmission spectrum for a simple display which is at 45° to two cross polarizers and constitutes a half-wave plate of the above-mentioned type at the required wavelength of 500 nm. The calculations are based on the Jones matrix algorithm, i.e. reflection, interference and absorption are neglected. The graph furthermore shows the calculated spectrum of the light state of a reflected display according to FIG. 9, an ideal mirror being assumed for this case. The comparison of these two curves now clearly shows that the configuration according to the invention has a substantially higher light transmittance than the simple transmitting configuration in the blue and red wavelength range. This effect could be slightly improved by optimizing the angle between the two polarizers (in the case of displays in FIGS. 2, 3, 6 and 7) or optionally between the two liquid crystal layers (in the case of the two-cell display in FIG. 3) [in this context, see: S. Panchcharatnam, Proc. Indian Acad. Sci., A 41, 137, 1955]. However, this would adversely affect the symmetry with regard to the voltage inversion, which might lead to flicker effects.

A shorter required wavelength than 500 nm shifts the maximum to shorter wavelengths. The red component is thus slightly reduced, and the thickness of the quarter-wave plate 5 according to FIG. 2 is then in turn reduced. This may be advantageous because the voltage drop over the quarter-wave plate (or over the compensator layer) is reduced as a result.

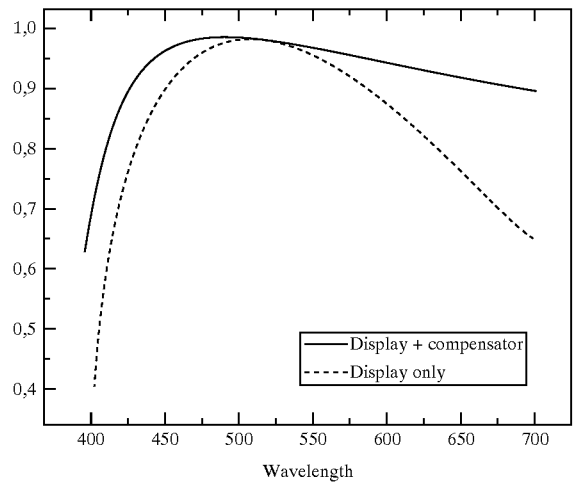

Alternatively to the above-mentioned optimization for "white" displays, in the embodiments shown in FIGS. 2, 6 and 7 the quarter-wave plate or quarter-wave layer 5 or 23 may additionally be formed with birefringences differing pixel by pixel, in order thus to produce different interference colors. Appropriate processes for the production of such plates or layers are disclosed in the publications "Photo-Induced Alignment and Patterning . . . , Jpn. J. Appl. Phys., Vol. 34, L764–L767, 1995" and "Photo-Generation of Linearly Polymerized Liquid Crystal . . . , Jpn. J. Appl. Phys., Vol. 34, 3240–3249, 1995" by M. Schadt, H. Seiberle, A. Schuster and S. M. Kelly.

What is claimed is:

1. A reflective ferroelectric liquid crystal display comprising a chiral smectic, birefringent liquid crystal layer, whose optical axis can be electrooptically rotated in the plane of the display; a polarizer; a pair of parallel plates which enclose the liquid crystal layer and each of which is provided with a surface structure orienting the molecules of the liquid crystal layer and at least one electrode for generating an electric field; and a light-reflecting mirror or a diffuse reflector being coordinated with one of the two plates, wherein the rotation of the optical axis of the liquid crystal layer is not more than +22.5°, wherein the display is formed such that it can represent one or more grey values, and wherein, as a further birefringent layer, an electrooptically switchable half-wave plate is arranged between the polarizer and the liquid crystal layer.

2. The liquid crystal display as claimed in claim 1, the electrode or electrodes being formed as pixel electrodes, wherein electronic components which in turn belong to an active matrix circuit are coordinated with the pixel electrodes.

3. The liquid crystal display as claimed in claim 2, wherein the electronic components are applied epitaxially to at least one of the two plates.

4. The liquid crystal display as claimed in claim 1, wherein the mirror or diffuse reflector acts also as the electrode or electrodes which one of said plates is provided with.

5. The liquid crystal display as claimed in claim 1, which has a DHF or an APD configuration.

6. A direct view display apparatus containing a liquid crystal display as claimed in claim 1.

7. A projection apparatus containing a liquid crystal display as claimed in claim 1.

8. The projection apparatus as claimed in claim 7, wherein the polarizer is a polarizing beam divider.

9. The liquid crystal display as claimed in claim 1, wherein the rotation of the optical axis of the liquid crystal layer is not less than −22.5°.

* * * * *